United States Patent
Takaishi et al.

(10) Patent No.: US 6,819,519 B2
(45) Date of Patent: Nov. 16, 2004

(54) HEAD POSITION CONTROL METHOD FOR A DISK DEVICE AND THE DISK DEVICE

(75) Inventors: Kazuhiko Takaishi, Kawasaki (JP); Yasumasa Kuroba, Kawasaki (JP); Mitsuo Kamimura, Kawasaki (JP); Tomoyoshi Yamada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 323 days.

(21) Appl. No.: 09/742,585

(22) Filed: Dec. 21, 2000

(65) Prior Publication Data

US 2001/0022702 A1 Sep. 20, 2001

(30) Foreign Application Priority Data

Mar. 17, 2000 (JP) ........................................ 2000-076785

(51) Int. Cl.[7] .............................................. G11B 5/596
(52) U.S. Cl. .................... 360/77.02; 360/63; 360/78.04
(58) Field of Search .......................... 360/77.02, 78.04, 360/63, 53, 48, 78, 4; 711/113, 114 A (56) References Cited

U.S. PATENT DOCUMENTS

| | | | | |
|---|---|---|---|---|
| 5,321,673 A | * | 6/1994 | Okazaki | ................. 369/13.35 |
| 5,535,372 A | * | 7/1996 | Benhase et al. | ............... 703/23 |
| 5,661,848 A | * | 8/1997 | Bonke et al. | ................ 711/112 |
| 5,784,220 A | * | 7/1998 | Nishimura et al. | ....... 360/78.14 |
| 5,822,142 A | * | 10/1998 | Hicken | .......................... 360/53 |
| 5,825,728 A | * | 10/1998 | Yoshimoto et al. | ....... 369/30.11 |
| 6,522,497 B1 | | 2/2003 | Kitagawa | ................. 360/78.04 |

FOREIGN PATENT DOCUMENTS

| | | |
|---|---|---|
| JP | 57-6414 A | 1/1982 |
| JP | 4-129071 A | 4/1992 |
| JP | 4-172668 A | 6/1992 |
| JP | 4-274002 A | 9/1992 |

\* cited by examiner

*Primary Examiner*—David Hudspeth
*Assistant Examiner*—K. Wong
(74) *Attorney, Agent, or Firm*—Greer, Burns & Crain, Ltd.

(57) ABSTRACT

This invention relates to a head position control method for a disk device that uses a disk medium whose tracks have been formatted externally, and a disk device that effectively uses the range of motion of an actuator. In a disk device that has a disk medium, a head, an actuator, a control circuit, there is a conversion mechanism that sets a data area in the writing range of the disk that corresponds to the range of motion of the actuator, and converts a logical address to a physical address in the data area. This invention makes it possible to set a storage capacity that makes maximum use of the range of motion of the actuator for any device, even when there is a position offset in the range of motion of the actuator.

16 Claims, 12 Drawing Sheets

PRIOR ART

FIG. 18

PRIOR ART

HEAD POSITION CONTROL METHOD FOR A DISK DEVICE AND THE DISK DEVICE

BACKGROUND OF THE INVENTION

1. Field of the Invention

This invention relates to a disk device that reads/writes information from a disk storage medium by way of a head, and more particularly to a head position control method and disk device that effectively uses the range of motion of an actuator to increase storage capacity.

2. Description of the Related Art

Disk storage devices such as magnetic disk drives and optical disk drives are widely used as storage devices for computers. Increased disk storage capacity is desired for these kinds of disk storage devices, and the storage capacity has been increasing every year.

Figure 17:
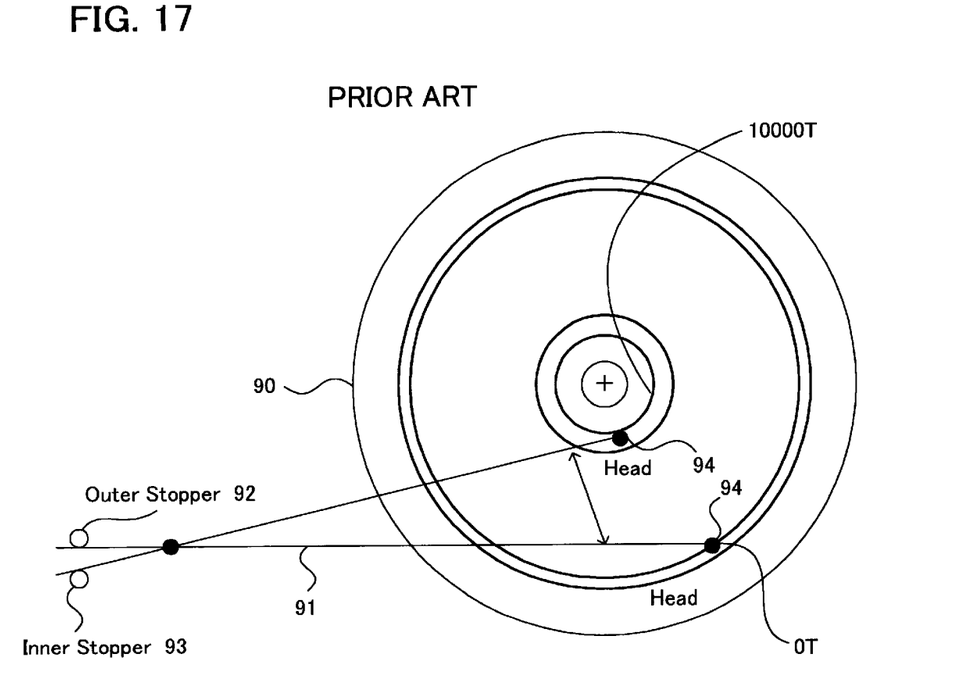
FIG. 17 is a drawing explaining a disk device of the related art.
Figure 18:
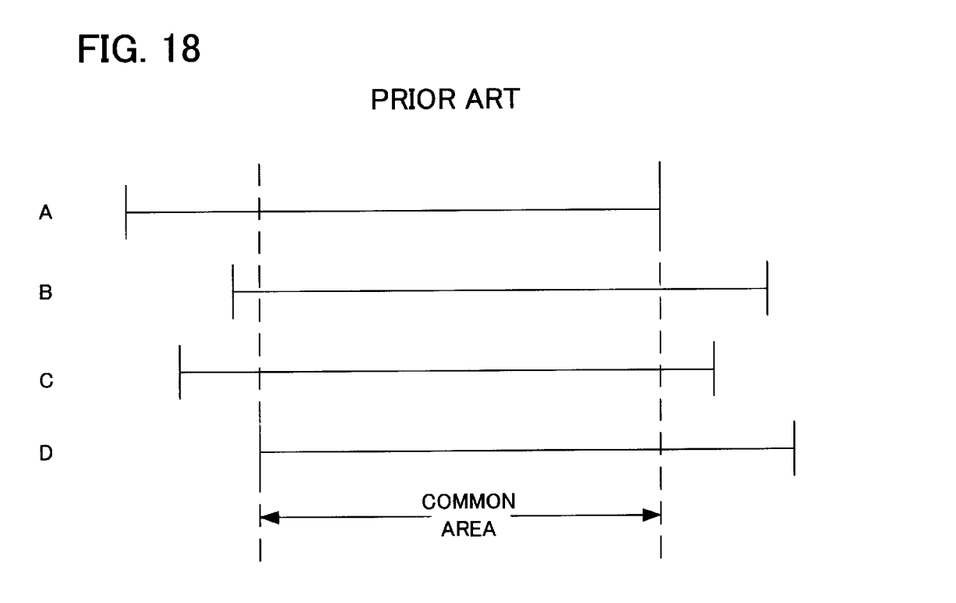
FIG. 18 is a drawing explaining the data area of the related art.

FIG. 17 is a schematic drawing of a disk storage device for explaining the related art, and FIG. 18 is a drawing explaining the range of motion of the actuator. As shown in FIG. 17, position information is recorded for each track 0T–10000T on the storage disk 90. The position information comprises a track number and a servo pattern.

The head 94 that reads/writes the disk 90 is moved in the radial direction of the disk 90 by the actuator 91. With this movement, the head 94 can be positioned at each of the tracks on the disk 90. This actuator 91 has a specified range of motion. In other words, the range of motion is limited to a range of desirable movement characteristics of the actuator 91. In order to do this, there is an outer stopper 92 and an inner stopper 93 on the actuator 91.

Therefore the head 94 can only move within the range specified by these stoppers 92, 93. On the other hand, FIG. 18 shows the range of motion for heads A, B, C and D by a different actuator. In other words, the distance between the center of the disk and the center of the actuator, and the distance from the center of the actuator to the head differs for each device. The device is designed and adjusted so that this position relationship is the same for each device, however errors occur.

Recently, the track width of disk devices is 1 $\mu$m or less, and when there is error of 50 $\mu$m, there is an offset of 50 tracks. Moreover, as shown in FIG. 18, the range of motion of the heads differs slightly for each device. In the prior self STW (servo track write) method, the disk device uses its own actuator to read the position information and format each track so this offset had no effect on the storage capacity.

On the other hand, a method is known of installing disks in the disk device for which the position information has been written and the tracks formatted outside the disk device. In this method, the position information is written on the disk by a special servo track writer, so it is possible to write position information at an accurate position even when the track pitch is small.

However, when using this disk in a disk device, it is necessary to consider the difference in the ranges of motion shown in FIG. 18. For example, even in the case of a fixed-disk device, it is possible to use the common area of each range of motion as the data area, such as in the case of a replaceable disk device.

However, in the related art described above, the common area is only part of the range of motion of the actuator, and the area outside of the common area cannot be used as the data area.

SUMMARY OF THE INVENTION

The objective of this invention is to provide a head position control method and disk device that effectively uses the range of motion of the actuator to increase storage capacity of the disk.

Another objective of this invention is to provide a head position control method and disk device that increases the storage capacity of the disk by address conversion.

Yet a further objective of this invention is to provide a head position control method and disk device that uses a disk whose tracks are formatted externally, and that effectively uses the range of motion of the actuator to increase storage capacity of the disk.

In order this objective, the head position control method for a disk device of one form of this invention comprises: a step of converting a logical address to a physical track position of the track such that the data area is set inside the writing area of a disk at a position within a restricted range of motion that an actuator is capable of moving the head over the disk; and a step of driving the actuator according to the position information that is read from the track of the disk by the head and according to the physical track position.

The disk device of one form of the invention comprises: a disk which has a plurality of physical tracks; a head for reading data from or writing data to the tracks of the disk; an actuator that moves the head over the disk; and a control unit that controls the position of the head to a physical track on the disk that corresponds to a logical address; wherein the control unit converts a logical address to a physical track position of the disk such that the data area is set inside the writing area of the disk at a position within the restricted range of motion that the actuator is capable of moving the head over the disk, and drives the actuator according to the position information that is read from the track of the disk by the head and according to the physical track position.

In this form of the invention, the entire writing area of the disk is formatted into tracks on which the position information is recorded. Also, in the disk device in which this disk is installed, a data area is set from that area according to the range of motion of its actuator. According to this setting, logical address starting from the higher order is converted to physical address to control the position of the head. Therefore, even in the case where a track-formatted disk is used in the device, it is possible to effectively use the range of motion of each device to increase the storage capacity. Moreover, this can be accomplished more easily by converting the addresses.

Moreover, a head position control method for a disk device of another form of this invention wherein the conversion step comprises: a step of operating the actuator with respect to the disk and measuring the starting position of the data area; and a step of using the starting position to convert the logical address to the physical track position.

In another form of the disk device of this invention, the control unit comprises a memory for storing the starting position of the data area that is obtained by operating the actuator with respect to the disk and measuring the data area; and a conversion unit for converting the logical address to the physical track position by using said starting position.

In this form of the invention, the starting position is measured for conversion, and since this starting position is used for performing conversion to a physical track position, it is possible to reduce the parameters needed for conversion, reduce the increased amount of data in memory and to make conversion more simple. Moreover, since measurement is performed within the device, it is possible to measure the data area accurately.

Furthermore, in the other form of head position control method for a disk device of this invention, the measurement step comprises: a step of measuring the starting positions for a plurality of areas that are divisions of the data area for a plurality of the heads that correspond to different surfaces of the disk; and a step of converting a logical address to a physical track position by using the starting position of a corresponding area of a corresponding said head number.

In another form of disk device of this invention, the head comprises a plurality of heads that correspond to different surfaces of the disk; the memory that stores all of the starting positions of a plurality of areas that are divisions of the data area for the heads; and the control unit that convert a logical address to a physical track position by using the starting position for the corresponding area of a corresponding head number.

This form of the invention corrects any offset that occurs due to assembly error between heads when there is a plurality of heads in one actuator. In this case, when a rotation-type actuator is used, the amount of offset differs between the outer circumference and inner circumference of the disk, so the offset is corrected by dividing the data area into a plurality of areas, and setting a starting position for each area.

In the other form of head position control method for a disk device of this invention, the measurement step comprises: a step of measuring the offset of the starting positions between all of the heads of the plurality of areas; and a step of setting head addresses that correspond to the logical addresses according to the offset of the plurality of areas.

In the other form of disk device of this invention, the memory stores the offset between the heads of the plurality of areas, and stores head addresses that are set to correspond to the logical addresses according to the offset in the plurality of areas.

In this form of the invention, when storing the relative offset for each area, a reference head for the relative position offset is set so that the areas do not overlap. Therefore, by converting the addresses, it is possible to prevent overlapping of areas even when relative offset is used to reduce the memory capacity.

DESCRIPTION OF THE PREFERRED EMBODIMENTS

The embodiments of this invention will be explained below in the order: disk storage device, another position control method, and another embodiment.

Disk Storage Device

Figure 1:
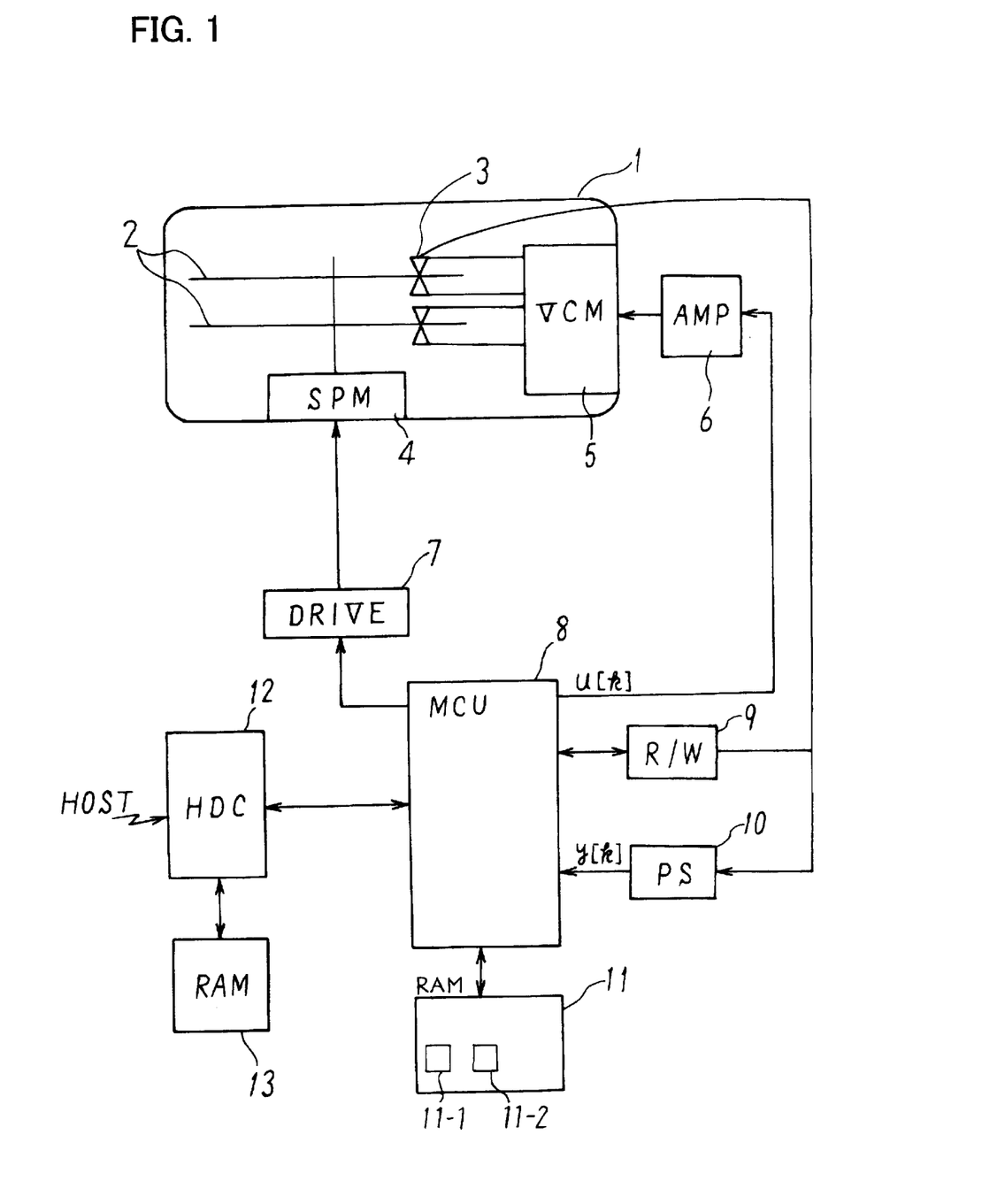
FIG. 1 is a schematic diagram of one embodiment of the disk device of this invention.
Figure 2:
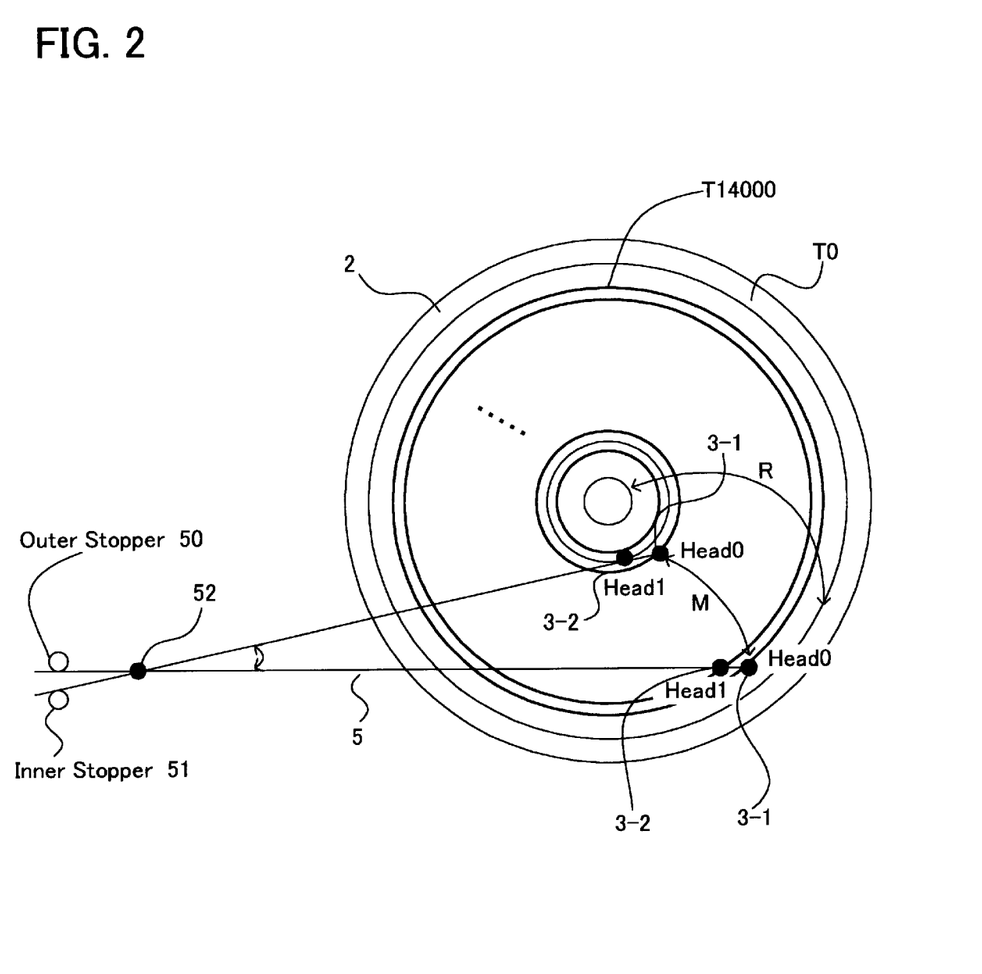
FIG. 2 is a drawing explaining the actuator and disk in FIG. 1.
Figure 3:
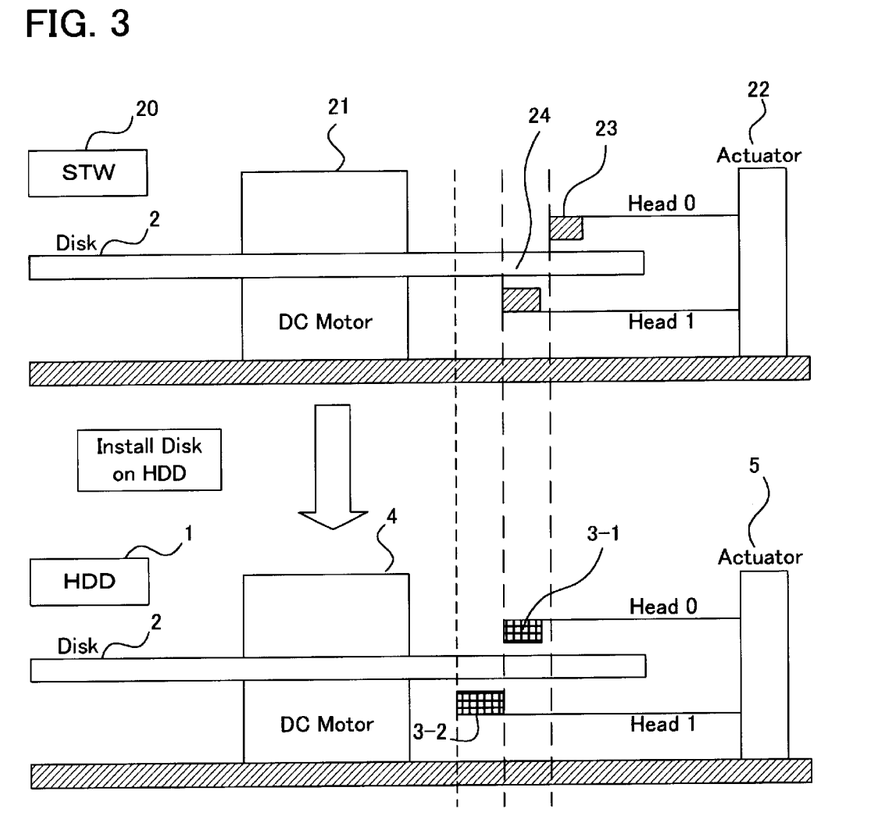
FIG. 3 is a drawing showing the relationship between the tracks of the disk and the head in FIG. 1.
Figure 4:
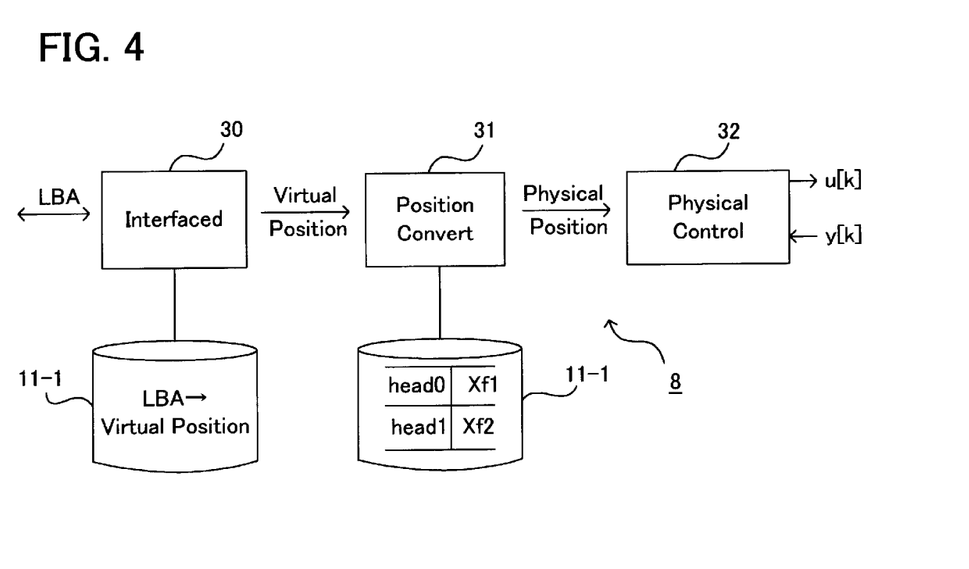
FIG. 4 is a schematic diagram of the MCU in FIG. 1.
Figure 5:
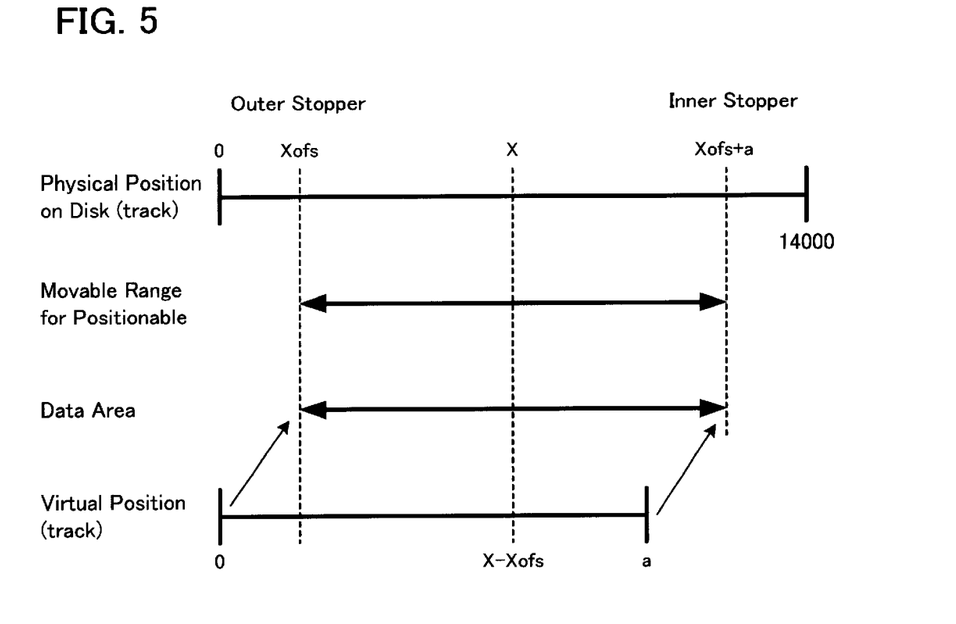
FIG. 5 is a drawing explaining the position conversion operation in FIG. 4.
Figure 6:
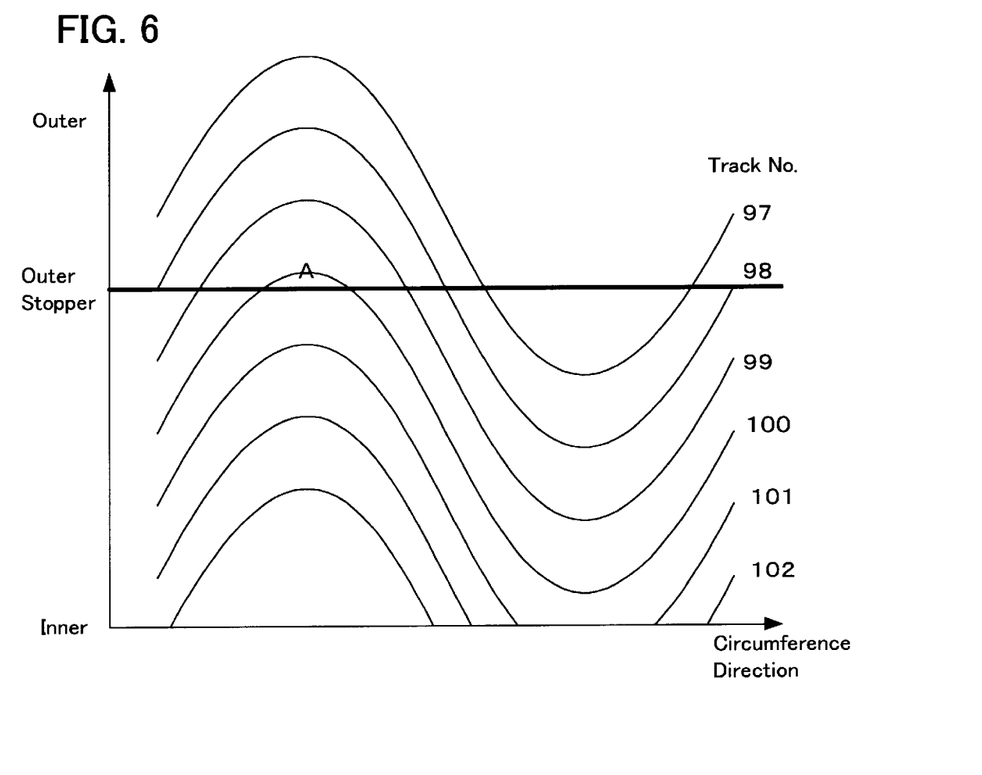
FIG. 6 is a drawing explaining the eccentricity for measuring the data area.
Figure 7:
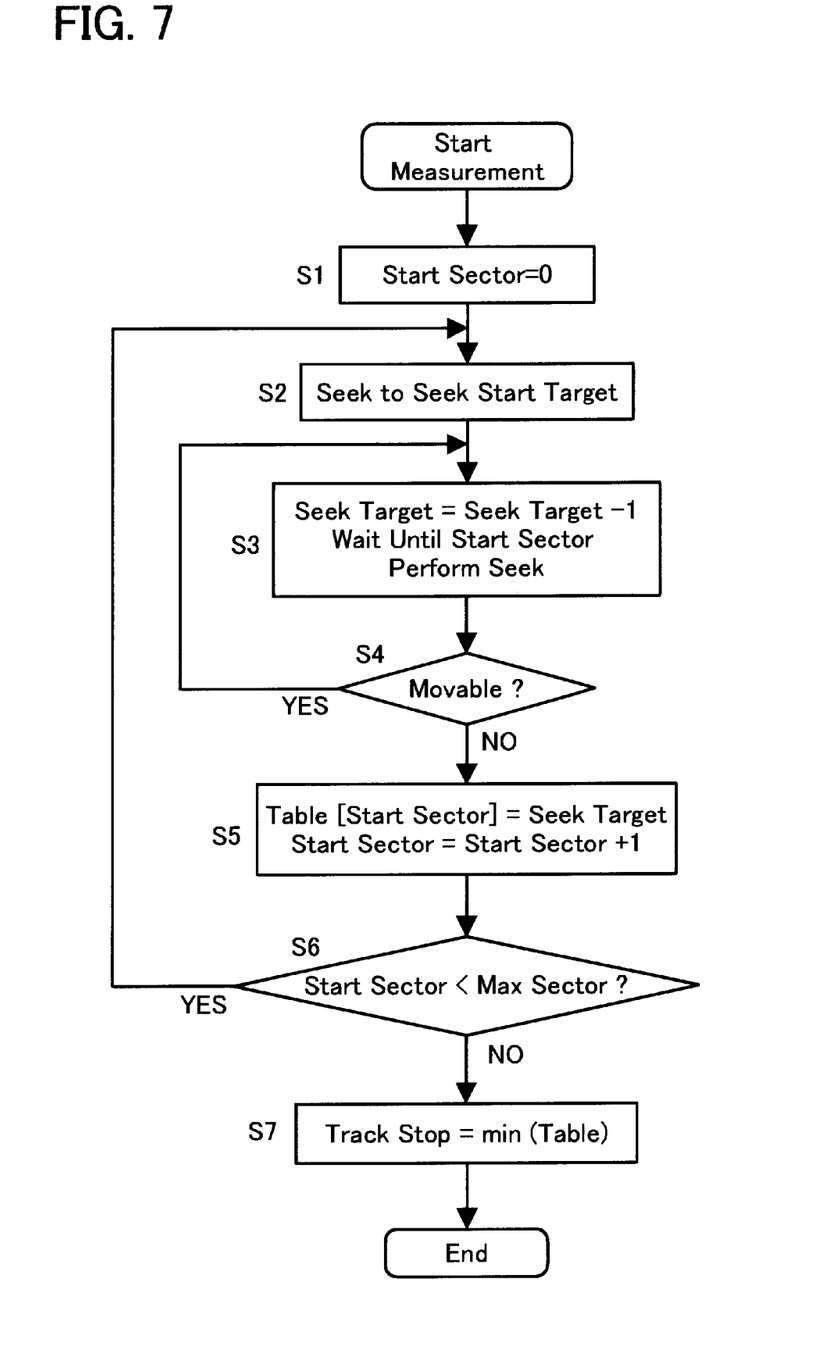
FIG. 7 is a flowchart for the converted position measurement of an embodiment of the invention.

FIG. 1 is a schematic diagram of one embodiment of the disk device of this invention, FIG. 2 is a drawing explaining the actuator in FIG. 1, FIG. 3 is a drawing explaining the position offset, FIG. 4 is a schematic diagram of position conversion unit, FIG. 5 is a drawing explaining position conversion, FIG. 6 is a drawing explaining the measurement of the starting position, and FIG. 7 is a flowchart of the measurement process.

FIG. 1 shows an example of using a fixed-type magnetic disk drive as the disk storage device. As shown in FIG. 1, the magnetic disk drive 1 comprises a magnetic disk 2 and a magnetic head 3. As shown in FIG. 2, the magnetic disk 2 has a plurality of concentric tracks T0–T14000, and each data track has several sectors in which all of the position information (track number, servo signal) is written. For example, for a 3.5-inch magnetic disk 2, there are 14,000 tracks on the surface of the disk 1, and there are 100 sectors on one track.

As shown in FIG. 2, the read/write area of this magnetic disk 2 is from track 0 T0 to track 14,000 T14000. As shown in FIG. 3, these tracks are written to the magnetic disk 2 by a servo track writer (STW) different from the disk device. This is a special device, and is capable of writing high-density tracks.

As shown in FIG. 3, this magnetic disk 2 is attached to the spindle 4 of the disk drive 1. Also as shown in FIG. 3, the positions of the heads 23, 24 of the STW 20 and positions of the heads 3-1, 3-2 of the disk device 2 are offset due to the position error between the devices.

Returning to FIG. 1, the magnetic head 3 reads information from or writes information to the magnetic disk 2. The magnetic head 3 comprises a MR (GMR, TMR) element, and writing element. The magnetic disk 2 is rotated by the spindle motor 4. A rotation-type actuator 5 having a voice-coil motor (VCM) supports the magnetic head 3 as well as moves the magnetic head 3 in the traverse direction across the tracks of the magnetic disk 2.

A power amp 6 drives the VCM of the actuator 5. A spindle drive circuit 7 drives the spindle motor 4. A control circuit 8 comprises a microprocessor, digital-signal processor, analog/digital converter, digital/analog converter and RAM 11.

The control circuit 8 (called a processor below) reads the position signal from the magnetic head 3, determines the current position y[k] of the magnetic head, and creates the control amount (control current) u[k] according to the distance (position error) from the target position (physical track position) r. A read/write circuit 9 controls reading/writing of the magnetic head 3. A position detection circuit 10 demodulates the servo signal from the magnetic head 3, and outputs the position signal to the processor 8.

A hard-disk controller 12 controls the interface with the host computer. There is RAM 13 in this hard-disk controller 12. The RAM 13 stores data from the host computer and data for the host computer.

FIG. 2 is a drawing showing the relationship between the aforementioned actuator 5 and the installed magnetic disk 2. The range of motion M of the actuator 5 is regulated by an outer stopper 50 and an inner stopper 51 on the actuator 5. In other words, the head 3-1 can move in an area M that is smaller than the read area R of the magnetic disk 2 (physical tracks T0–T14000). For example, the data area M is from physical track 100 to physical track 11,000. As mentioned above, the starting position of this data area M, differs for each actuator and each device. This data area is measured by the measurement described later with FIG. 6.

A logical address (LBA), which does not directly indicate this physical track, is given from the host. Therefore, it is necessary to convert this logical address to a physical address in the data area that has been set like this. FIG. 4 is a block diagram of the functions of the position control system for doing this, and FIG. 5 is a drawing explaining that process.

As shown in FIG. 4, the MCU 8 comprises an interface unit 30, a position converter 31 and a position control unit 32. The interface unit 30 uses a virtual position table 11-1 to convert the logical address from the HDC 12 to a virtual position (head, track). As shown in FIG. 5, the virtual position uses the physical track 0, for example, as a reference with respect to the physical track of the magnetic disk 2, and is set within the range of the capacity set for that disk surface such that it is common for each device.

The position converter 31 uses a correction table 11-2 to convert the virtual position to a physical track within the data area. The correction table 11-2 stores the starting positions Xofs of the data areas for each head 3-1, 3-2 as the number of tracks from the physical track 0 of the disk 2. Moreover, the position converter 31 reads the starting position Xofs from the table 11-2, adds it to the virtual position 31 and calculates the actual physical track. This relationship is shown in FIG. 5, where the starting position is set such that it has a margin, with respect to the position of the outer stopper, for thermal deformation or deformation due to impact.

The position control unit 32 is a well-known servo control unit that takes the physical track position to be the target position, and calculates the amount of control from the position error between this target position and the current position obtained from the head 3, and it is possible to use current observer control. Here, the table 11-2 stores the starting positions for each of the heads 3-1, 3-2. When there are two or more heads 3-1, 3-2 attached to one actuator 5, such as shown in FIG. 2, the position for each head differs due to installation error. Therefore, since the starting positions for each of the heads differ, the starting position for each head is stored.

Next, the process for measuring the starting position of the aforementioned data area M will be explained. In order to do that, the MCU 8 moves the actuator 5 to the outer side of the disk, and at the point where the actuator will not move any further, the MPU 8 detects the track address that is read by the head. This is performed at the factory and the address is stored in the table 11-2.

When doing this for a device that uses a disk that is formatted externally as described above, eccentricity occurs due to differences in the center of rotation. FIG. 6 shows the eccentricity of this disk. In order to position the entire track when eccentricity occurs, it is necessary to detect the track where the maximum value of eccentricity is at the position of the outer stopper. In the case of FIG. 6, that track is track no. 100. FIG. 7 is a flowchart of the measurement process for doing this.

(S1) Sets the starting sector StartSector to '0'.

(S2) Seeks the track position Seek StartTarget that does not come in contact with the pre-determined stopper.

(S3) Decreases the target position SeekTarget by '−1', waits for the head to rotate to the starting sector StartSector and seeks for the target track SeekTarget.

(S4) The MCU 8 determines whether the head can move. For example, it determines whether the track number read by the head changes from seeking. When the head has moved, the process returns to step S3.

(S5) When the head cannot move, that target position is taken to be the maximum outer position for that sector position, and it is stored in the table. The starting sector is increased by '+1'.

(S6) Next, the starting sector StartSector is judged whether it is less than the maximum sector MaxSector. When it is less, the process returns to step S2.

(S7) When it is not less, the minimum value is found from the maximum outer track position for each sector that is stored in the aforementioned table, and that value is taken to be the stopper track position. The process also ends.

A margin for thermal deformation from this measured stopper track position is assumed when setting the starting position, and that value is set in the table 11-2. In this way, tracks with position information are formed over the enter write area of the disk, and in the case of a disk device that uses this disk, the data area is set according to the range of motion of the device, so even when the starting point of motion of each device differs, it is possible to increase the storage capacity by effectively taking advantage of the range of motion. Moreover, since the data area is measured for each device, it is possible to even further increase the storage capacity. Here, a hard disk device is explained as the disk device, however, the invention can also be applied to an optical disk device or magneto-optical disk device in which the disk is fixed.

Another Position Control Method

Figure 8:
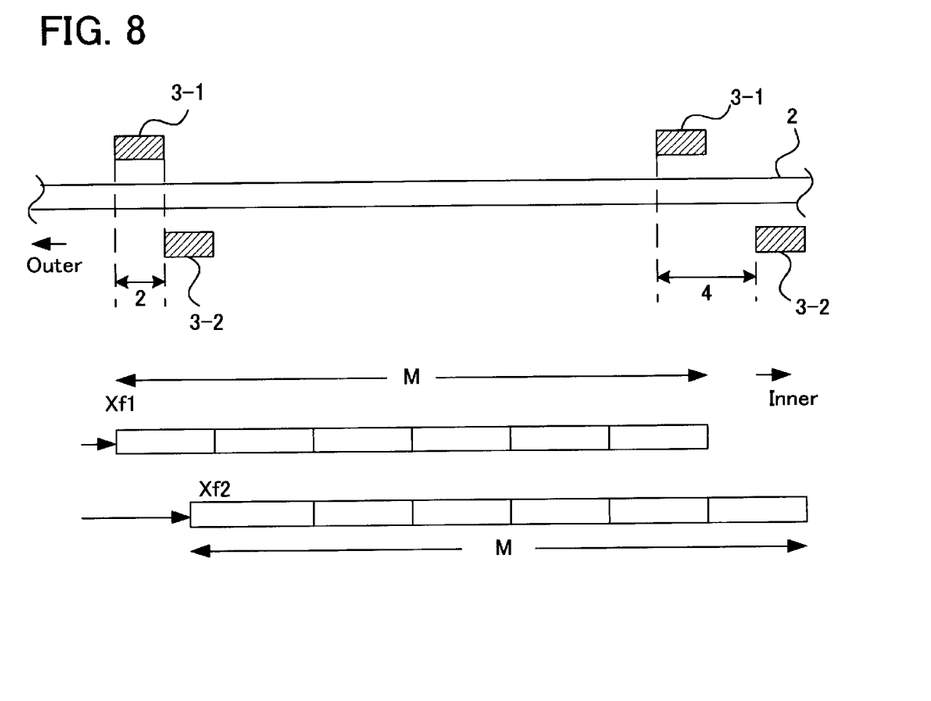
FIG. 8 is a drawing explaining the amount of position offset between the head in order to explain another position conversion method of this invention.
Figure 9:
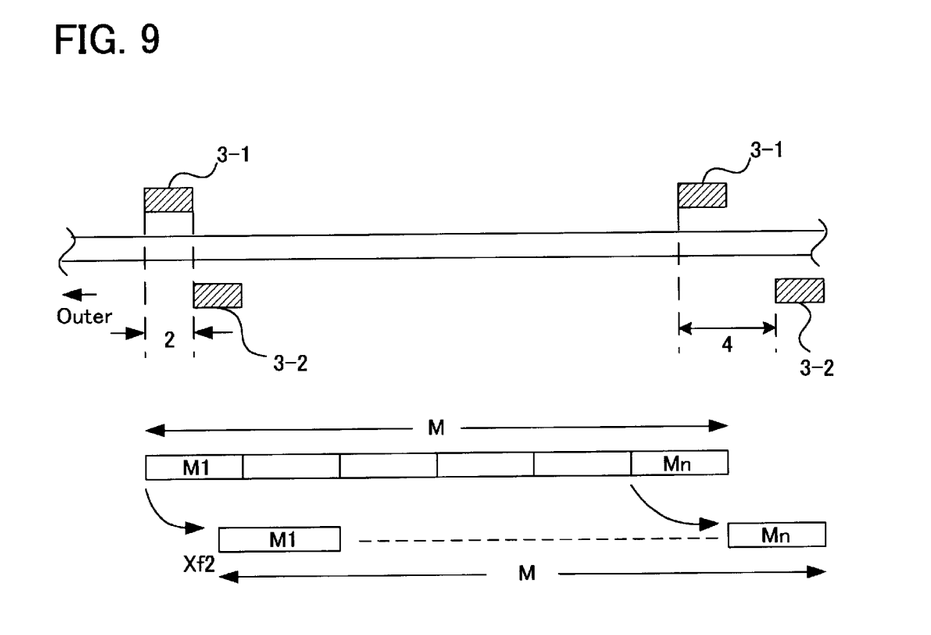
FIG. 9 is a drawing explaining position conversion of another embodiment of the invention.

FIG. 8 and FIG. 9 are drawings explaining another position control method of the invention. When using a rotation-type actuator 5 as shown in FIG. 2, movement in an arc shape. Therefore, the position offset between the two heads 3-1, 3-2 on the actuator 5 is different at the outside and inside of the disk 2 as shown in FIG. 8. For example, on the outside, when the head 3-1 is at track number 1000 and the head 3-2 is at track number 1002, there is an offset of two tracks between the heads. On the inside, when the head 3-1 is at track number 10000 and the head 3-2 is at track number 10004, there is an offset of four tracks between the heads.

In other words, as described above, when the entire data areas of the heads are defined by the starting positions Xf1, Xf2, this difference in the offset between the heads brings about an increase in seeking time when changing heads. For example, when the starting position of head 3-1 is track 1000, and the starting position for head 3-2 is track 1002, head 3-1 is selected, and when the virtual position is track 9000, the physical address of head 3-1 becomes track 10000, and the physical address of head 3-2 becomes track 10004. Therefore, when track 9000 is specified as the virtual position for head 3-2, or in other words, when switching heads, it is necessary to position the head 3-2 at track 10002 at the starting position described above. Therefore, seeking over two tracks is necessary.

To prevent seeking when changing heads, it is possible to makes the starting position of the head 3-2 at the inside position different from the starting position at the outside position. In other words, as shown in FIG. 9, the data area M is divided into a plurality of areas M1–Mn according to the difference in position offset between the heads, and a starting point is set for each area. For example, in the example described above, the starting point for the outside area of the head 3-2 is taken to be track 1002 as is, and the starting point for the inside area becomes track 1004.

Figure 10:
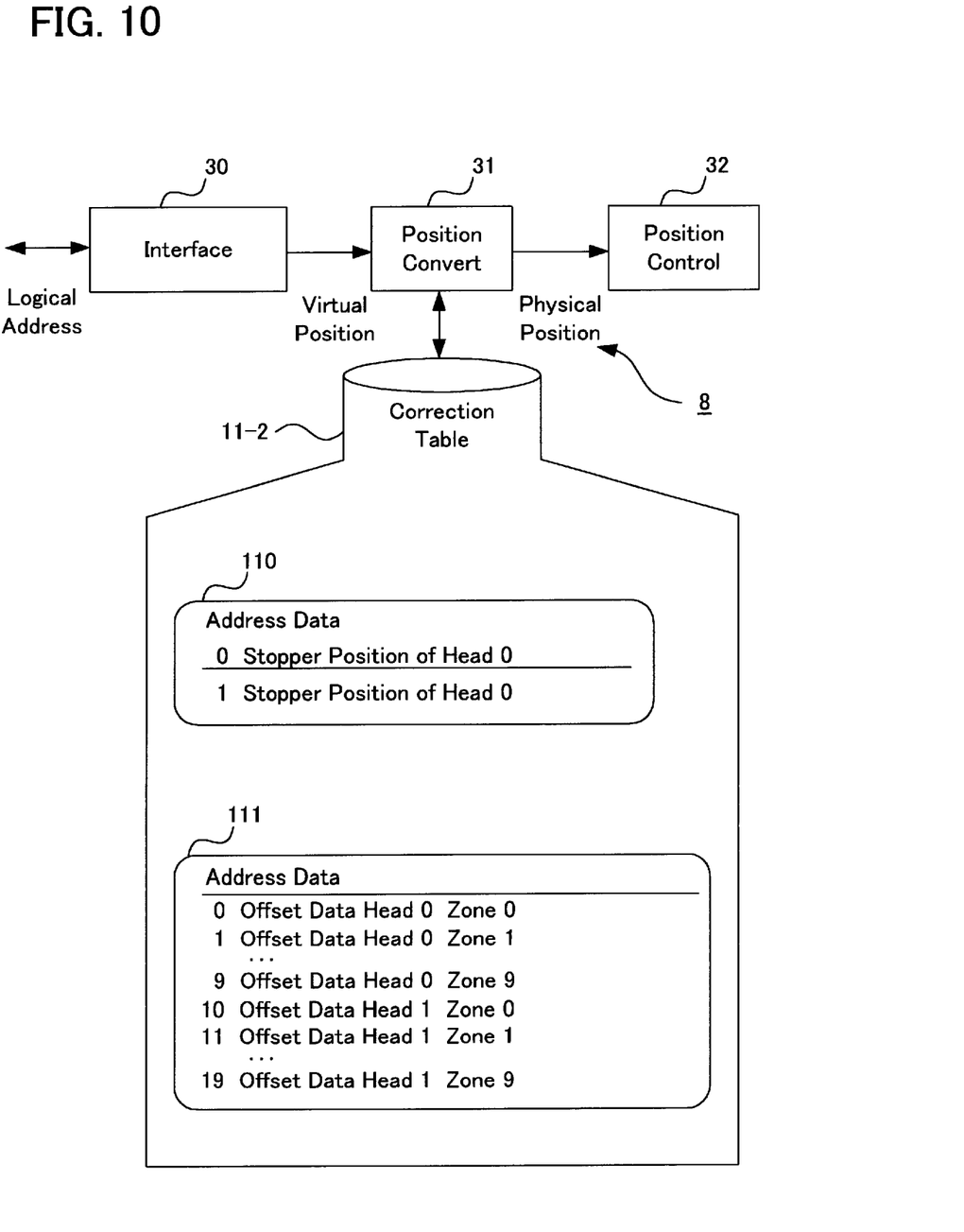
FIG. 10 is a block diagram of the position control unit of another embodiment of the invention.

FIG. 10 is a schematic diagram of a position control unit for another embodiment of the invention, and it is constructed such as to minimize seeking when changing heads. In FIG. 10, the same symbols are used for parts that are identical to those shown in FIG. 4.

The correction table 11-2 comprises two tables 110, 111. The first table 110 stores the outside stopper positions for each of the heads 3-1, 3-2. The second table 111 stores the amount of position offset of the areas of each of the heads 3-1, 3-2. This position offset is defined as the amount of offset of an area from the outside stopper position.

Moreover, the position converter 31 references the table 110 according to the given head number, and finds the outside stopper position for that head, then finds the assigned zone (area) from the virtual track position. Also, the position converter 31 finds the amount of position offset for that zone from table 111. The converter 31 then adds the external stopper position and the amount of position offset to the virtual position to calculate the physical track position.

The outside stopper position is obtained from the measurement described above. The amount of position offset of each zone is calculated by seeking a specified track that is set for each zone, calculating the amount of position offset between heads from the track number read by each head, and calculating the amount of position offset for each zone of each head. In this case, generally the amount of position offset of the areas of the reference head, head 3-1 in FIG. 9, is zero, and the data area of the reference head continues from this.

In this embodiment, the reason for storing the amount of position offset of both heads is, that since the seeking distance is minimized when changing heads, it makes it possible for the reference head to offset in the same way.

Figure 11:
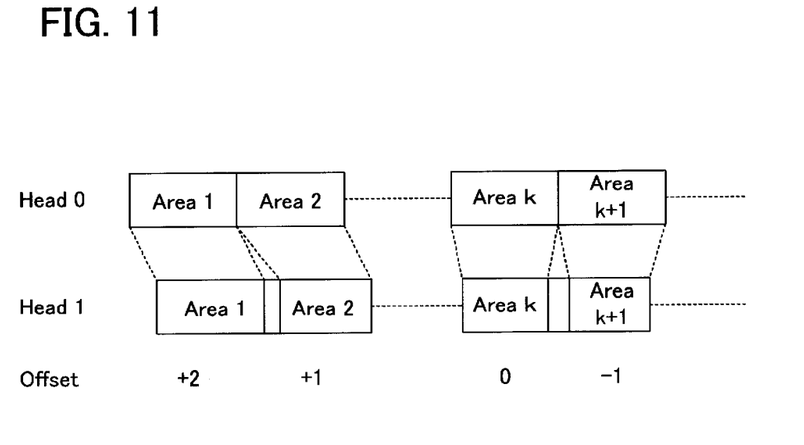
FIG. 11 is a drawing explaining the amount of position offset between heads in order to explain a different position conversion method of the invention.
Figure 12:
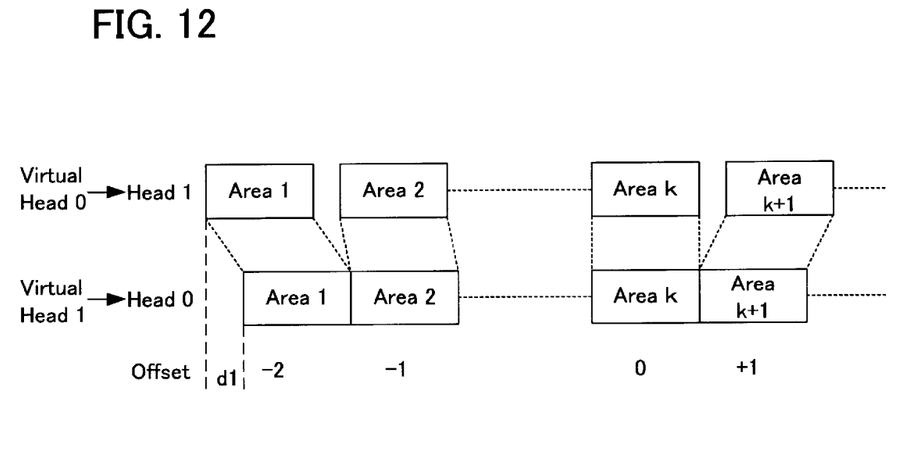
FIG. 12 is a drawing explaining position conversion of a different embodiment of the invention.

FIG. 11 and FIG. 12 are drawings explaining position conversion of another embodiment of the invention. This is an example of changing the embodiment explained with FIG. 9 and FIG. 10. As explained in FIG. 9 and FIG. 10, by setting areas for a plurality of heads and correcting the position offset, it is possible to reduce the amount of seeking when changing heads. In FIG. 9 and FIG. 10, when the amount of position offset of the reference head is taken to be zero, it is not necessary to store the amount of position offset of the reference head. Moreover, it is possible to reduce the area for storing the amount of position offset. In other words, by storing the amount of relative position offset of the other head with respect to the reference head, it is possible to reduce the memory capacity and obtain the same effect.

In this case, it is assumed that the amount of relative position offset increases from the outside toward the inside. As shown in FIG. 11, when the amount of position offset of the head 1 is reduced with respect to the reference head 0, the areas for head 1 become overlapped. To prevent this, when the amount of position offset is reduced, the reference head is replaced with head 1 and the dependent head is replaced with head 0, as shown in FIG. 12. The inverse of the symbols used above are used for the amount of position offset.

Figure 13:
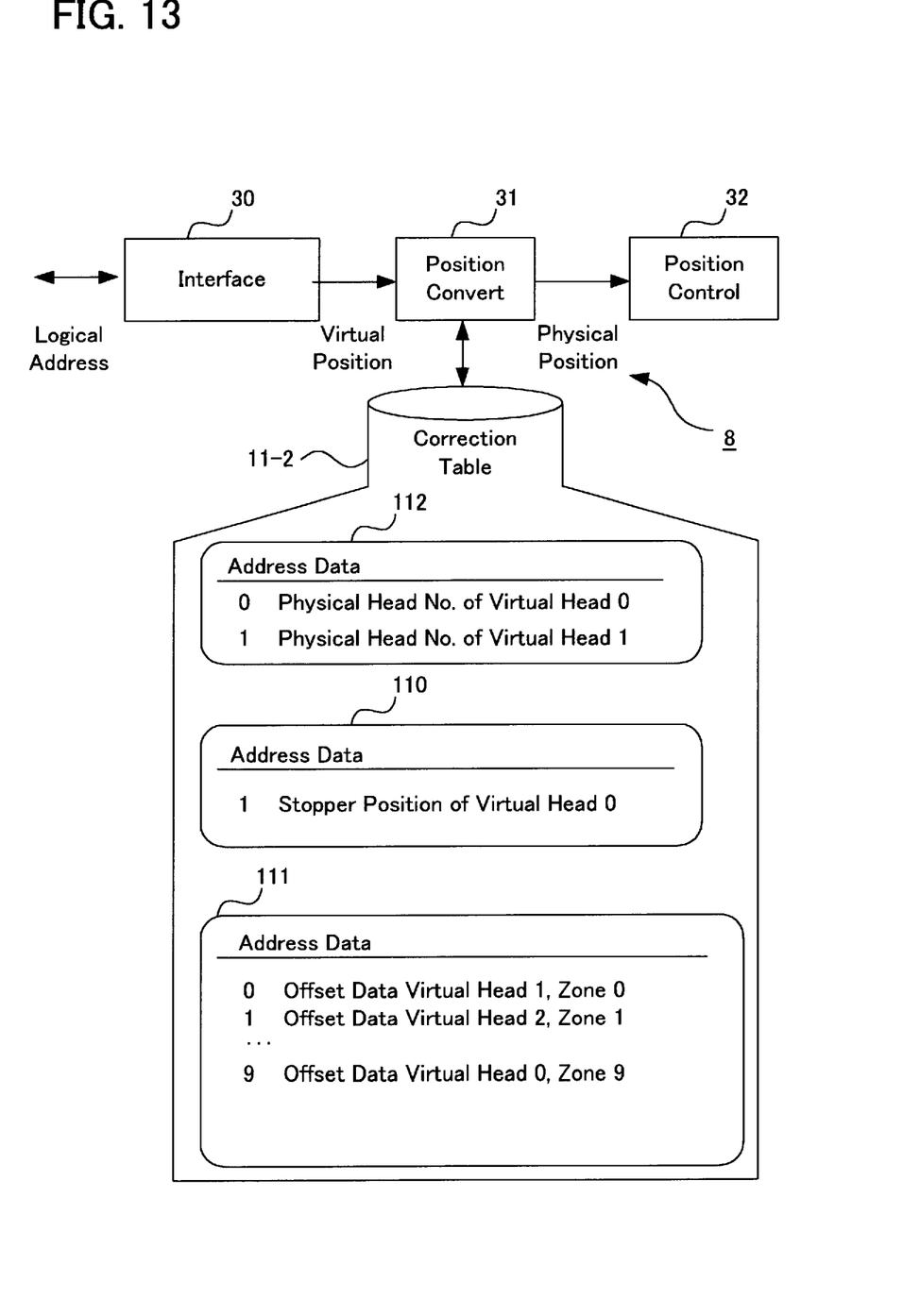
FIG. 13 is a block diagram of the position control unit of a different embodiment of the invention.

FIG. 13 is a schematic diagram of the position control unit of another embodiment of the invention, and it is constructed to minimize the amount of seeking when changing heads. In FIG. 13, the same symbols are used for parts that are identical to those shown in FIG. 4 and FIG. 10.

The correction table 11-2 comprises three tables 110, 111, 112. The third table 112 stores the physical head numbers which correspond to the virtual heads 0, 1 that were converted by the interface processing unit 30. The first table 110 stores the outside stopper position for the virtual head 0. The second table 111 takes the areas of the virtual head 0 to be a reference and stores the amount of position offset for each area of the virtual head 1.

Moreover, the position converter 31 references the table 112 according to a given virtual head number, to find the corresponding physical head. Then references the table 110 to find the stopper position for the virtual head number 0, then finds the assigned zone (area) from the virtual track position. Also, when the virtual head number is '1', the position converter 31 finds the amount of position offset of that zone from table 111. When the virtual head is '0', the position converter 31 adds the outside stopper position to the virtual track position to calculate the physical track position. Furthermore, when the virtual head is '1', the position converter 31 adds the stopper position and the amount of position offset to the virtual track position to calculate the physical track position.

Figure 14:
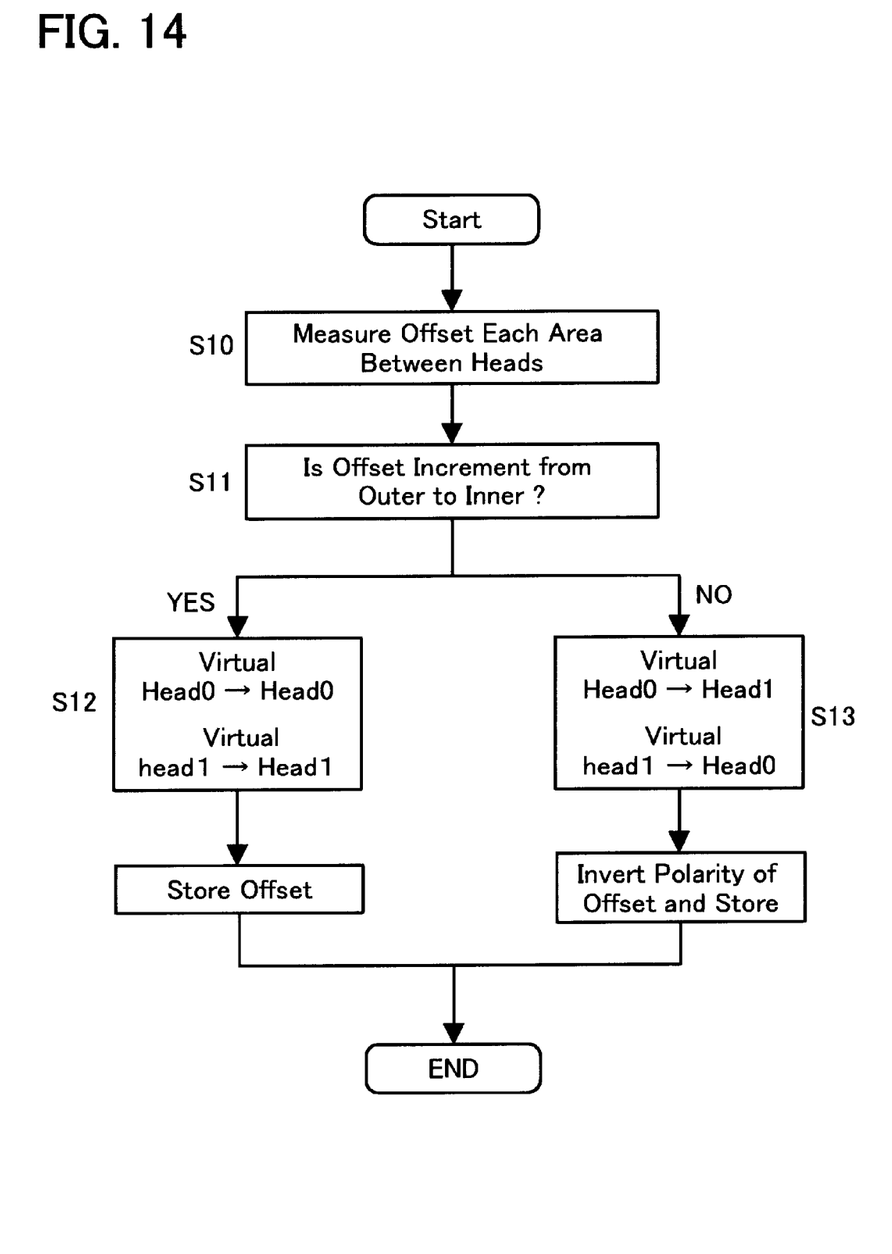
FIG. 14 is a flowchart of the position offset measurement for different position conversion of the invention.

The outside stopper position is obtained from the measurement described above. The amount of position offset between heads in each zone is obtained by seeking for a specified track set for each zone and calculating the amount of position offset between heads from the track number read by each head. This measurement method is shown in FIG. 14.

(S10) Measures the amount of position offset between heads at each zone as described above.

(S11) Compares the position offset and determines whether the offset increases in the direction from the outside inward.

(S12) When the offset increases, head 0 is set in table 112 and as virtual head 0, head 1 is set as virtual head 1, and the amount of offset of each measured area is stored in table 111 and measurement ends.

(S13) When the offset does not increase, there is overlapping at the boundaries of the areas, as shown in FIG. 11, so head 1 is set in table 112 and as virtual head 0, and head 0 is set as virtual head 1, as shown in FIG. 12. Also, the symbols for the amount of offset of each measured area is inverted and stored in table 111 and measurement ends.

In this embodiment of the invention, in addition to the effect of reducing the memory as described above, the measurement process is simplified since it is possible to use the measured position offset as is.

Another Embodiment

Figure 15:
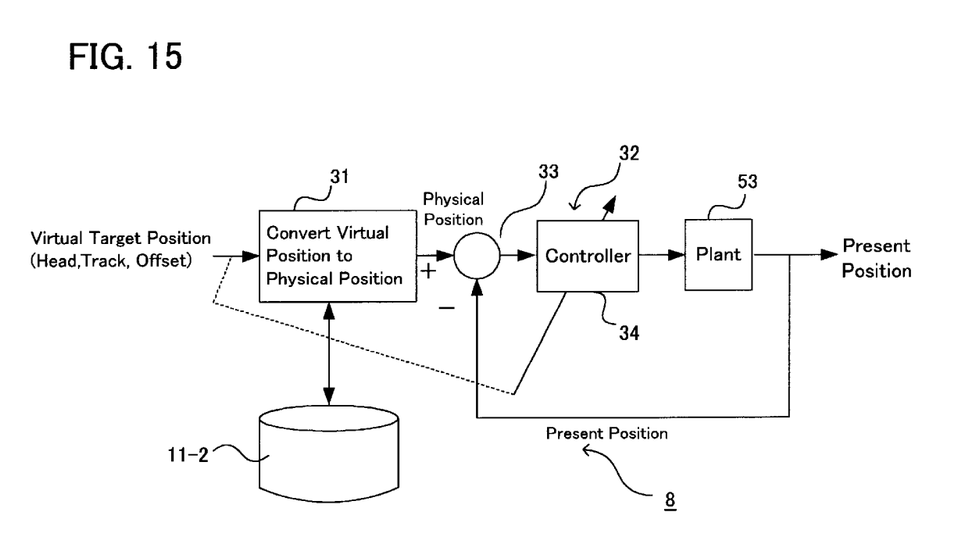
FIG. 15 is a block diagram of the position control unit of yet another embodiment of the invention.

FIG. 15 is a block diagram of the position control unit of yet another embodiment of the invention. In the figure, the same symbols are used for parts that are identical to those shown in FIG. 1, FIG. 4, FIG. 10 and FIG. 13. In FIG. 15, the position control unit 32 comprises a computation unit 33 that calculates the position error, and a servo controller 34. The computation unit 33 subtracts the current position, that has been demodulated from the position signal read by the head 3, from the converted physical track position, and computes the position error. The servo controller 34 computes the amount to control the actuator 5 from the position error.

The servo controller 34 corrects the servo loop gain, corrects the detection sensitivity of the head, and corrects the bias force to be applied to the actuator according to the actuator position. The correction processes, using calibration results that are indispensable for positioning control, are performed according to the aforementioned virtual position.

In other words, by reading the calibration results according to the virtual position that is common to each actuator, it is possible to use a processing program that is common for all devices. In the case that the converted physical position is used, the physical position differs even though the actuator is in the same position, so it is not possible to use a common program.

Figure 16:
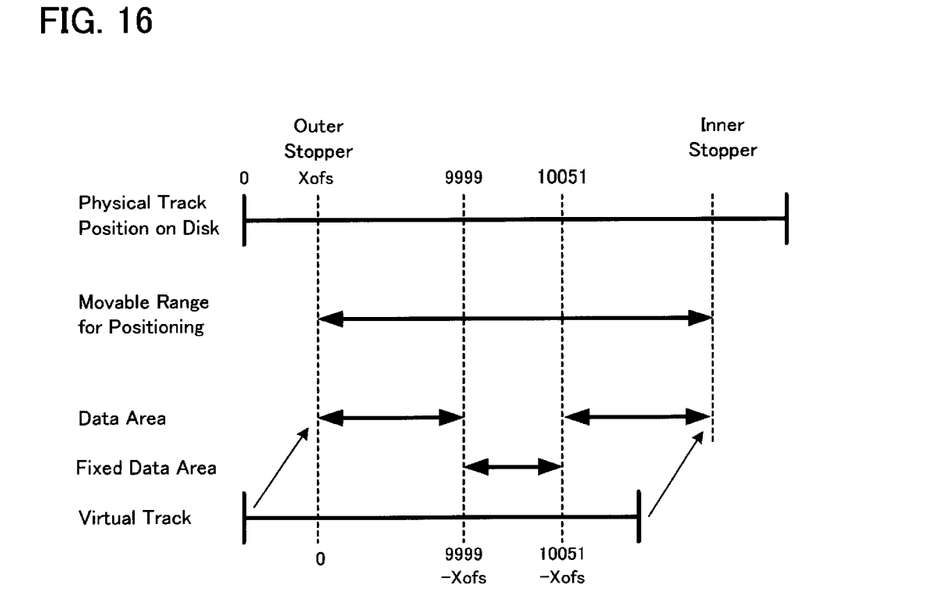
FIG. 16 is a drawing explaining the table storage area of an embodiment of the invention.

FIG. 16 is a drawing explaining another embodiment of the invention, and shows the storage position in the aforementioned table 11-2. As described above, the table 11-2 differs for each device, so the storage position becomes a problem. One example is storing the positions in non-volatile memory (ROM) on the circuit.

In this case, when it becomes necessary to replace the circuit due to some kind of trouble, table 11-2 is also lost. Therefore, it takes time to remake the table 11-2 for that device. So in order that the table 11-2 is not lost from the device when replacing the circuit, the table 11-2 is store on disk medium. In this case, the table 11-2, which is unique to the device, can be stored on the center track of the data area (unique information storage area), as shown in FIG. 16. By doing this, the information can always be accessed even when there is thermal deformation of the disk or the disk receives an impact. Here, the position offset for each area is set in the table 11-2 such that it is accessed by jumping over the aforementioned area for storing unique information.

The preferred embodiments of the present invention have been explained, however the invention is not limited to these embodiments and can be embodied in various forms within the scope of the present invention.

In a disk device, in which a disk is installed whose entire writing area is formatted with tracks that are written with position information, the data area is set within that area according to the range of motion of the device actuator. A logical address from the host is converted to a physical address and the head position is controlled according to this setting. Therefore, in all devices, even when a track-formatted disk has been installed in the device, it is possible to effectively take advantage of the range of motion of the actuator to increase the storage capacity. Moreover, it is possible to make this easier through address conversion.

What is claimed is:

1. A head position control method for a disk device for controlling a head position at a physical track on a disk that corresponds to a logical address, comprising:

a step of converting said logical address to a physical track position indicating a track position in a radial direction of said disk such that a data area is set inside a writing area of said disk defined by a restricted range of motion that an actuator is capable of moving a plurality of heads over said disk;

a step of driving said actuator according to position information that is read from a track of said disk by at least one of said heads and according to said converted physical track position; and a step of operating said actuator with respect to said disk and measuring said data area defined by said range of motion of said actuator by measuring a starting track position for each of a plurality of said heads that corresponds to a different surface of said disk, at one end of said range of motion of said actuator;

wherein said converting step comprises a step of converting said logical address to a head number and said physical track position by using said starting track position of a corresponding area of a corresponding said head number.

2. The head position control method for a disk device of claim 1 wherein said measurement step comprises:

a step of measuring an offset of the starting positions between all of said heads of said plurality of areas; and a step of setting head addresses that correspond to said logical addresses according to the offset of said plurality of areas.

3. The head position control method for a disk device of claim 1 wherein said operating step comprises:

a step of pressing said actuator to an outer or inner stopper and measuring the starting track position of said data area.

4. The head position control method for a disk device of claim 1 wherein said measurement step comprises:

a step of measuring an offset of the starting track positions between said plurality of areas; and a step of setting the offset of said plurality of areas as said start track address.

5. A disk device comprising:

a disk which has a plurality of physical tracks in a radial direction of said disk;

at least one head for reading data from or writing data to the tracks of said disk;

an actuator that moves said at least one head over said disk; and a control unit that controls the position of said at least one head at a physical track on said disk that corresponds to a logical address;

wherein said control unit converts said logical address to a physical track position of said disk such that a data area is set inside a writing area of said disk defined by a restricted range of motion that said actuator is capable of moving said at least one head over said disk; and drives said actuator according to position information that is read from the track of said disk by said at least one head and according to said physical track position; and wherein said control unit comprises:

a memory for storing a starting track position of said data area defined by said range of motion of said actuator, said starting track position being measured at one end of said range of motion of said actuator in the disk device; and a conversion unit for converting said logical address to said physical track position by using said starting track position;

wherein said at least one head comprises a plurality of said heads that correspond to different surfaces of said disk;

said memory stores all of the starting track positions of a plurality of areas that are divisions of said data area for said heads; and said control unit converts said logical address to a head number and said physical track position by using said starting track position for the corresponding area of a corresponding said head number.

6. The disk device of claim 5 wherein;
said memory stores an offset between said heads of said plurality of areas, and stores head addresses that are set to correspond to said logical addresses according to offset in said plurality of areas.

7. The disk device for a disk device of claim 5 wherein said control unit performs a self measurement of said data area by operating said actuator with respect to said disk.

8. The disk device of claim 7 wherein;
said control unit measures a starting track position of said data area by operating said actuator with respect to said disk and converts said logical address to said physical track position by using said measured starting track position.

9. The disk device of claim 7 wherein;
said control unit measures said starting track position by pressing said actuator to an outer or inner stopper of said actuator.

10. The disk device of claim 5 wherein;
said memory stores an offset of the starting track positions between said plurality of areas according to said measurement.

11. The head position control method for a disk device of claim 2 wherein said setting step comprises:
a step of setting a head having measured offsets that increase between said plurality of areas to first head addresses that correspond to said logical addresses.

12. The disk device of claim 6 wherein;
said memory stores an offset between said plurality of areas, and stores head addresses that are set to correspond to said logical addresses according to increasing of said offset in said plurality of areas.

13. A head position control method for a disk device for controlling a head position at a physical track on a disk that corresponds to a logical address comprising:
a step of converting said logical address to a physical track position of said disk such that a data area is set inside a writing area of said disk defined by a restricted range of motion that an actuator is capable of moving the head over said disk;
a step of driving said actuator according to position information that is read from a track of said disk by said head and according to said converted physical track position; and
a step of operating said actuator with respect to said disk and measuring said data area defined by said range of motion of said actuator,
wherein said operating step comprises a step of measuring starting track positions for two data areas divided in a system area for storing system data and provided at absolute track positions at one end of said range of motion of said actuator; and
said converting step comprises a step of converting said logical address to said physical track position by using said starting track position of a corresponding area of a corresponding head number.

14. A disk device comprising:
a disk which has a plurality of physical tracks;
a head for reading data from or writing data to the tracks of said disk;
an actuator that moves said head over said disk; and
a control unit that controls the position of said head at a physical track on said disk that corresponds to a logical address;
wherein said control unit converts said logical address to a physical track position of said disk such that a data area is set inside a writing area of said disk defined by a restricted range of motion that said actuator is capable of moving said head over said disk; and drives said actuator according to position information that is read from the track of said disk by said head according to said physical track position, and
wherein said control unit comprises:
memory for storing starting track positions of two data areas divided in a system area for storing system data and provided at absolute track positions in a radial direction of said disk that is measured at one end of said range of motion of said actuator; and
a conversion unit for converting said logical address to said physical track position by using said starting track positions.

15. A head position control method for a disk device for controlling a head position at a physical track on a disk corresponding to a logical address comprising:
a step of converting said logical address to a physical track address of said disk such that a data area is set inside a writing area of said disk defined by a restricted range of motion that an actuator is capable of moving a plurality of heads over said disk; and
a step of driving said actuator according to position information that is read from a track of said disk by at least one of said heads and according to said converted physical track position; and
wherein said converting step comprises;
a step of converting said logical address to a virtual physical address including a head number and a virtual track position; and
a step of converting said virtual track position to said physical track position by using a starting track position of a corresponding area of a corresponding said head number, said starting track position being measured at one end of said range of motion of said actuator in the disk device.

16. A disk device comprising:
a disk which has a plurality of physical tracks in a radius direction of said disk;
a plurality of heads that correspond to different surfaces of said disk;
an actuator that moves said heads over said disk; and
a control unit that converts a logical address to a physical track address of said disk such that a data area is set inside a writing area of said disk defined by a restricted range of motion that an actuator is capable of moving a plurality of heads over said disk; and drives said actuator according to position information that is read from a track of said disk by at least one of said heads and according to said converted physical track position; and
wherein said controller converts said logical address to a virtual physical address including a head number and a virtual track position and then converts said virtual track position to said physical track position by using a starting track position of a corresponding area of a corresponding said head number, said starting track position being measured at one end of said range of motion of said actuator in the disk device.

* * * * *